March 12, 1957  N. A. BYLUND  2,784,943
ROCK DRILL BIT WITH CUTTING INSERT
Filed Oct. 30, 1953

INVENTOR
Nils Axelsson Bylund
BY Pierce, Scheffler & Parker
his ATTORNEYS

United States Patent Office 2,784,943
Patented Mar. 12, 1957

2,784,943

ROCK DRILL BIT WITH CUTTING INSERT

Nils Axelsson Bylund, Sandviken, Sweden, assignor to Sandvikens Jernverks Aktiebolag, Sandviken, Sweden, a corporation of Sweden Application October 30, 1953, Serial No. 389,391

Claims priority, application Sweden November 3, 1952

8 Claims. (Cl. 255—64)

The present invention relates to a rock drill bit having a cutting insert of relatively hard metal such as the sintered carbides brazed into a groove in a drill bit body of relatively soft metal such as steel.

It is known that a relatively thin layer of brazing metal has a greater strength than a thicker layer. However in brazing cutting inserts of hard metal, by which is meant the hard metal carbides such as tungsten carbide, sintered together with a metal or a metal alloy such as cobalt, and a drill bit body of steel along a moderately large surface, serious difficulties are encountered due to the difference in the coefficients of expansion. In the usual type of joint, where the surfaces which are to be brazed together are parallel, the elasticity of the brazing metal is often not sufficient to accommodate the shrinkage of the hard metal in relation to the steel which occurs during the cooling of the joint and the brazing layer is damaged. This is especially noticeable at the outer or peripheral parts of the joint and is due to the great difference in coefficients of linear expansion between the hard metal for instance, about $5.5 \times 10^{-6}$, and steel for instance, $12 \times 10^{-6}$. It has been attempted to avoid this damage by increasing the thickness of the brazing joint, and this expedient has reduced damage to the joint due to the difference in coefficients of expansion but has encountered the difficulty that the thicker brazing joint is not as strong as an undamaged thin brazing joint.

The present invention relates to a solution of this problem which combines the strength of a thin brazing joint with the elasticity of a thicker joint. It relates to a rock drill bit with a cutting insert of hard metal brazed into a groove in the drill bit body of softer metal and is characterized in that the brazing joints at the side surfaces and/or the bottom surfaces of the cutting insert are thinner at centrally situated areas of the joint than at more peripherally situated areas of the same joint. In such a joint at the central areas where the stresses caused by the difference between the coefficients of linear expansion are small a high strength of the bond between the hard metal and the steel is obtained on account of the thinness of this part of the joint and at the same time a satisfactory centering of the insert is obtained. At the peripherally situated areas of the joint the stresses are greater on account of the linear expansion but the stresses are absorbed by the thicker layer of brazing metal which is therefore not damaged. The thinnest areas of the brazing joint should have a thickness within the range from about 0.08 to about 0.01 mm., the preferred thickness being about 0.05 mm. The thickest areas of the brazing joint may have a thickness as great as about 0.8 mm. This thickness may be limited by the capillarity of the brazing metal i. e. the brazing metal may not be able, by capillarity, to fill a space as large as 0.8 mm.

The side surfaces of the cutting insert may be curved from top to bottom or from end to end to form substantially cylindrical surfaces or said surfaces may be curved in both directions to form substantially spherical surfaces. Or the side surfaces of the groove or both the side surfaces of the insert and the side surfaces of the groove may be curved to give the described variation in the thickness of the joints. Or the side surfaces of the insert and/or the side surfaces of the groove may be formed in other ways to be described hereinafter to give the described variation in the thickness of the joint. Similarly the bottom surface of the insert and/or the bottom surface of the groove may be curved from side to side or from end to end or both or formed in other ways to give the described variation in the thickness of the joint.

The invention is illustrated in the accompanying drawings in which

Fig. 1 is a side elevational view, partly in section, showing a portion of the drill bit body and an insert Fig. 2 is a plan view of the drill bit face showing the side surfaces of the insert curved from end to end Fig. 3 is an axial section of another form of drill bit in which the side surfaces of the insert are curved both from end to end and from top to bottom Fig. 4 is a plan view of another modification in which the side surfaces of the groove are curved from end to end Fig. 5 is a plan view of another embodiment in which the side surfaces of the insert are in two planes at an obtuse angle to each other Fig. 6 is an axial section illustrating a modification in which the side surfaces of the insert are at an obtuse angle to each other and both are at an angle to the axis of the bit Fig. 7 is a side view of the cutting insert of Fig. 6

Fig. 8 is a plan view of a further embodiment in which the side surfaces of the cutting insert are formed of stepped plane areas, Fig. 9 is a side elevational view of a cutting insert the bottom surface of which is curved from end to end and Figs. 10 and 11 are cross sections of the drill bit in planes at right angles to each other showing the curvature as in Fig. 3.

Referring to Fig. 1, 1 is the drill bit body and 2 is the cutting insert. The bottom surface of this insert and the bottom surface of the groove in the drill bit body are plane as indicated by the straight joint of uniform thickness 3. The side walls of the insert 2 are not shown in Fig. 1 but as appears in Fig. 2 they are curved from end to end while the side walls of the groove in the drill bit body are plane so that the side wall joints 4, are thicker at their ends than in the middle. In this embodiment the side surfaces of the insert are convex cylindrical surfaces and may be right circular cylindrical surfaces.

In Fig. 3 the side surfaces of the insert are curved both from end to end and from top to bottom e. g. a portion of a spherical surface, so that the joints 5 are thicker at both the top and at the ends than at the point 6 which is midway between the ends and adjacent the bottom of the insert.

It is to be understood that the curved side surfaces of the insert of Fig. 2 are not necessarily right circular cylindrical surfaces but may have any other curvature so long as they are convex and are generated by the movement of a straight line along a curved path to successive parallel positions. It is further to be understood that the surfaces of the insert of Fig. 3 are not necessarily spherical surfaces but may have any other curvature so long as they are convex and curved both horizontally and vertically i. e. from end to end and from top to bottom. The curvatures in both instances may be on a radius 10 to 20 times the length or height respectively of the insert.

Figure 1:
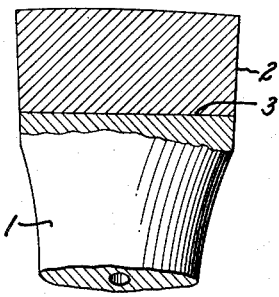
Figure 3:
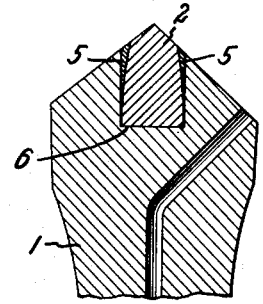
Figure 2:
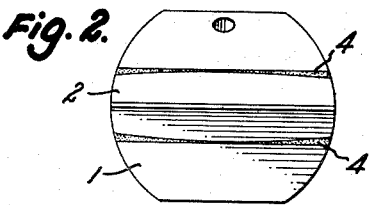
Figure 4:
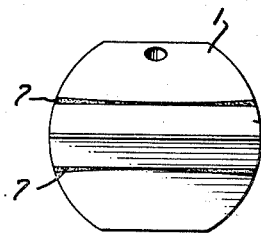
Fig. 4 illustrates an embodiment in which the side surfaces of the insert are plane and the side surfaces of the groove in the drill bit are curved so that the joints 7 are thicker at the ends than in the middle.
Figure 5:
Fig. 5 illustrates an embodiment in which the side surfaces of the inserts are formed by two plane surfaces which intersect each other at the middle of the insert so that the joints 8 are thicker at the ends than in the middle. The resulting surface is an approximation of the curved surfaces described above with reference to Fig. 2.
Figure 6:
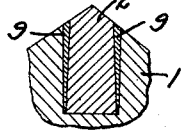

In the embodiment illustrated in Fig. 6, the side surfaces are formed by two intersecting planes as in Fig. 5 which are not only at an angle to each other horizontally but also at an angle to the vertical axis of the insert so that the joints 9 are not only thicker at the ends than at the middle of the insert but also thicker at the top than at the bottom of the insert. This is an approximation of the curved surface of Fig. 3.

Figure 7:
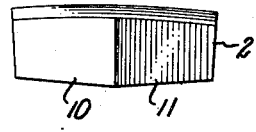

Fig. 7 serves to illustrate the surfaces of the inserts of both Figs. 5 and 6 i. e. it shows the surface formed by two intersecting planes 10 and 11.

Figure 8:
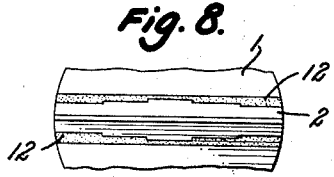

Fig. 8 illustrates an embodiment in which the side surfaces of the insert are made up of stepped plane areas so that the joints 12 are thicker at the ends than in the middle. This also is an approximation of a curved surface.

Figure 9:
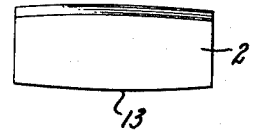
Figure 10:
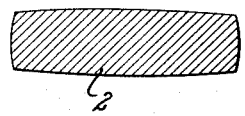
Figure 11:
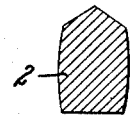

Fig. 9 illustrates an insert having a curved bottom surface 13.

The several embodiments illustrated and described above may be combined in a variety of ways. I have illustrated and described six specific kinds of surfaces i. e. plane, cylindrical, spherical, planes intersecting each other at an angle in only one direction, planes intersecting each other at angles in two directions and stepped surfaces. These six kinds of surfaces are applicable in four locations. i. e. the side surfaces of the inserts, the bottom surfaces of the inserts, the side surfaces of the grooves and the bottom surfaces of the grooves. Such surfaces may be applied singly or in any combination so long as the result gives side joints or bottom joints or both which are thicker at the ends than at the middle of the insert. It follows of course that all surfaces cannot be plane surfaces. As stated above a preferred embodiment is one in which the bottom surfaces of the insert and groove are plane and the side surfaces of the insert or of the groove are curved.

Spacing materials may be employed as described in British Patent No. 624,164, bits of said spacing material being inserted at the widest areas of the spaces to be occupied by the brazing metal.

It is to be understood that my invention is not limited to the use of the usual brazing metals, it being within the scope of my invention to use non-metallic bonding materials such as the synthetic resins or plastics.

I claim:

1. Rock drill bit with a cutting insert of hard metal brazed into a groove in the drill bit body of a softer metal characterized in that the brazing joint between at least one surface of the insert and the opposed surface of the groove is of progressively increasing thickness in both directions from the axis of the bit toward the ends of the insert.

2. Rock drill bit according to claim 1, characterized in that at least one of the opposed surfaces of the insert and the groove is curved from end to end.

3. Rock drill bit according to claim 1, characterized in that at least one of the opposed surfaces of the insert and the groove is formed of at least two intersecting plane surfaces.

4. Rock drill bit according to claim 1, characterized in that at least one of the opposed surfaces of the insert and the groove is formed of at least two intersecting plane surfaces which are at an oblique angle to the longitudinal axis of the drill bit.

5. Rock drill bit according to claim 1, characterized in that at least one of the opposed surfaces of the insert and the groove is formed of stepped plane surfaces.

6. Rock drill bit according to claim 5 in which both of the opposed surfaces of the insert and the groove are formed of stepped plane surfaces.

7. Rock drill bit according to claim 5 in which one of the opposed surfaces of the insert and the groove is formed of stepped plane surfaces and the other of said opposed surfaces is plane.

8. Rock drill bit according to claim 3 in which one of the opposed surfaces of the insert and groove is formed of intersecting plane surfaces and the other of said opposed surfaces is plane.

References Cited in the file of this patent

UNITED STATES PATENTS

| | | |
|---|---|---|
| 2,101,376 | Voigtlander | Dec. 7, 1937 |
| 2,614,813 | Shepherd | Oct. 21, 1952 |
| 2,628,072 | Baker | Feb. 10, 1953 |